United States Patent

Prölss

[11] 4,243,536
[45] Jan. 6, 1981

[54] CROSS-FLOW FILTRATION APPARATUS

[75] Inventor: Ludwig Prölss, Bellach, Switzerland

[73] Assignee: Kilcher-Chemie AG, Recherswil, Switzerland

[21] Appl. No.: 963,994

[22] Filed: Nov. 27, 1978

[30] Foreign Application Priority Data

Dec. 1, 1977 [CH] Switzerland ............ 14689/77

[51] Int. Cl.³ .............. B01D 29/34; B01D 31/00
[52] U.S. Cl. ............................ 210/321.1; 210/331; 210/347; 210/456; 210/461; 210/433.2; 55/158; 55/484
[58] Field of Search ............ 210/321 A, 346, 347, 210/321 R, 433 R, 331, 416 M, 433 M, 438, 439, 441, 461, 456, 321 B; 55/158, 484; 422/48

[56] References Cited

U.S. PATENT DOCUMENTS

| | | | |
|---|---|---|---|
| 2,207,618 | 7/1940 | Grill et al. | 210/331 |
| 3,074,559 | 1/1963 | Savino | 210/321 B |
| 3,398,833 | 8/1968 | Marks et al. | 210/321 R |
| 3,398,834 | 8/1968 | Nuttall et al. | 210/321 R |
| 3,410,058 | 11/1968 | Oswin | 55/158 |
| 3,450,267 | 6/1969 | Jarvis | 210/321 R |
| 3,456,805 | 7/1969 | Jarvis | 210/321 R |
| 3,943,057 | 3/1976 | Jamet et al. | 210/321 R |
| 4,025,425 | 5/1977 | Croopnick et al. | 210/23 H |

FOREIGN PATENT DOCUMENTS

2153334  5/1973  France ................ 210/321 R
2263017  10/1975  France ................ 210/321 B

OTHER PUBLICATIONS

"Flow Through Uniformly Taped Pipes" B. G. Vander Hegge Zijnen, Applied Science Research, vol. A3. No. 2, The Hague, 1951.

*Primary Examiner*—Charles N. Hart
*Assistant Examiner*—David R. Sadowski
*Attorney, Agent, or Firm*—Wender, Murase & White

[57] ABSTRACT

Apparatus for the cross-flow filtration of liquids or gases, such apparatus having disc-shaped filter elements which are located concentrically around a filtrate collecting pipe and within a tubular jacket, and an inlet and outlet pipe extending parallel to the filtrate collecting pipe, each inlet and outlet pipe having an aperture between each filter element to ensure that the liquid to be filtered is supplied tangentially thereby assuming a helical flow across the filter elements. The filter elements are provided on both sides with a microporous membrane and are provided with a supporting layer having sealed passages in order to supply the filtrate to the central collecting pipe.

8 Claims, 6 Drawing Figures

CROSS-FLOW FILTRATION APPARATUS

BACKGROUND OF THE INVENTION

The present invention relates to an apparatus for cross-flow filtration.

Extremely finely pored filter membranes used during ultra-filtration and reverse osmosis in industry require considerably high pressures and large surface areas. For manufacturing and economic considerations it is therefore desirable to arrange as much filter area as compactly as possible in a pressure chamber. To avoid clogging of the pores and salt polarisation, respectively, the liquid to be filtered is carried at a considerable flow velocity parallel to the filter surface, i.e. in a turbulent state, so that alluvial particles of colloidal to molecular size are constantly removed from the membrane or diaphragms. With the so called "cross-flow" filtration, the liquid is generally repeatedly carried past the filter diaphragms until the concentration of dissolved particles increases to a predetermined limit.

Generally, tubular filter elements are used for cross-flow filtration and have the advantage of a low pressure drop but have a low filter area per unit. Moreover, the manufacture of tubular membranes having a uniform pore diameter requires a considerable wall thickness of the filter elements and is limited with respect to the choice of materials.

The use of disc-shaped filter elements has therefore been proposed for cross-flow filtration. In U.S. Pat. No. 3,456,805 and No. 3,398,833, the filter elements are arranged in the form of a labyrinth seal, such that the medium to be filtered flows around each individual filter element and thereby experiences a reversal of about 180°. Due to this labyrinth construction, however, the pressure drop is quite high and the yield relatively low, whereby it decreases from one filter assembly to the other. French Patent Specification No. 2,153,334 discloses a filter assembly which has disc-shaped filter elements which are connected to a rotatable hollow shaft. The sludge arrives from above on the filter assembly, whereby the filtrate is collected in the central hollow shaft, whilst the concentrated sludge is again discharged from an outlet at the bottom. This apparatus is however of cumbersome structure, especially because of the problems arising with the sealing of the rotating hollow shaft.

SUMMARY OF THE INVENTION

Therefore, an object of the present invention is to provide an apparatus which, especially during the filtration of liquids, has a high degree of efficiency and has a simple and economical structure.

This object is attained by an apparatus for cross-flow filtration of fluids, comprising a tubular jacket, a plurality of disc-shaped filter elements stacked axially one upon the other in the jacket, a filtrate collecting pipe around which the filter elements are concentrically arranged, at least one inlet pipe and at least one outlet pipe extending parallel to the filtrate collecting pipe and each having at least one aperture per filter element; each filter element being supplied with fluid from the inlet pipe tangentially and in parallel connection in such a manner that the fluid to be filtered flows simultaneously over all of the filter elements is a helical pattern.

DESCRIPTION OF THE PREFERRED EMBODIMENT

Figure 1:
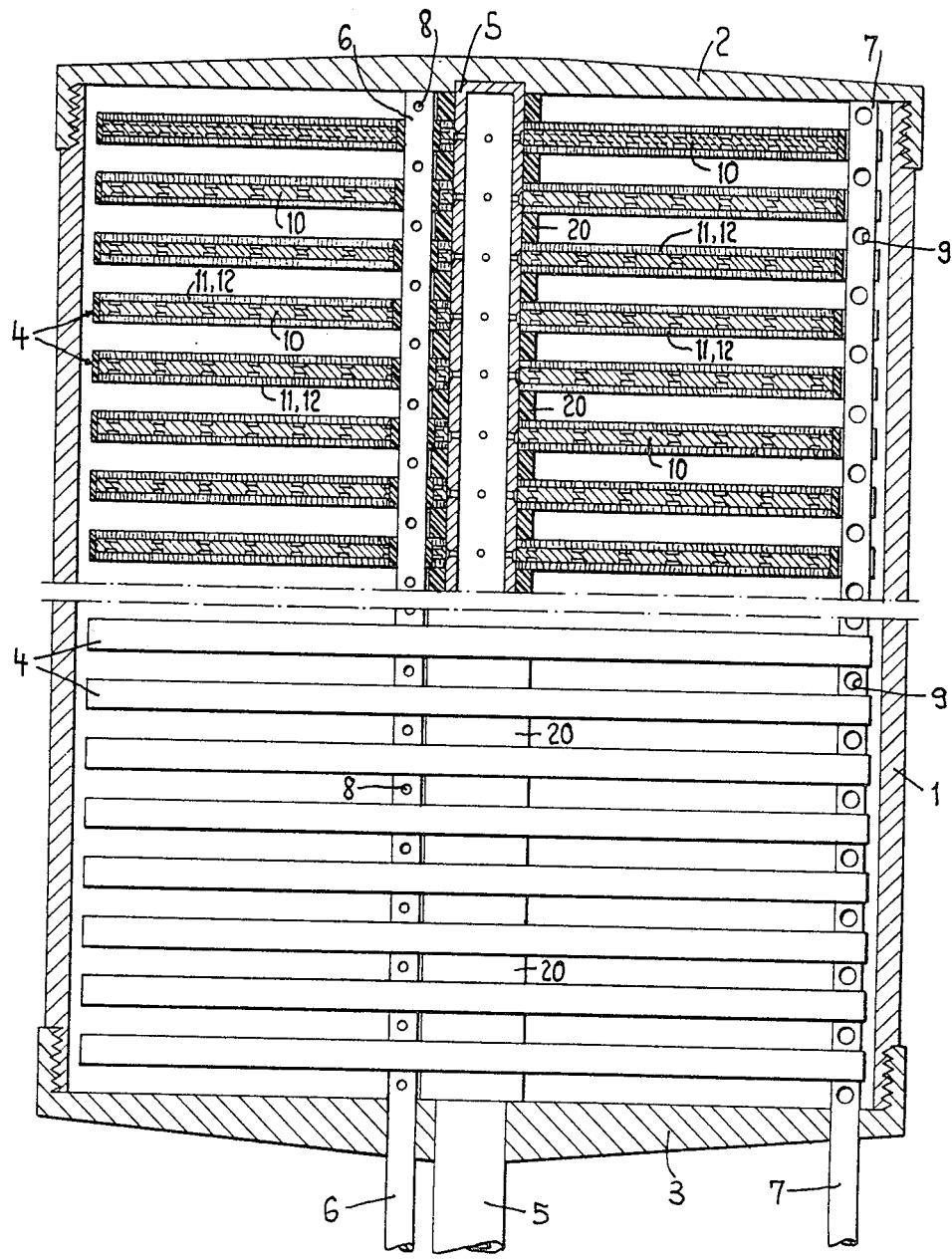
FIG. 1 is a cross-sectional view of a preferred embodiment of a filtration apparatus in accordance with the present invention.

An apparatus for cross-flow filtration is shown in FIG. 1 and comprises a tubular or cylindrical jacket 1, two seals 2 and 3, a plurality of filter elements 4, a central filtrate collecting pipe 5, a centrally located inlet pipe 6 and a peripherally located outlet pipe 7. The centrally located inlet pipe 6 extends through the filter elements 4 and has a plurality of relatively small apertures 8 located between the elements and opening tangentially with respect thereto. The outlet pipe 7 also extends between the filter elements 4, and has apertures 9 which are larger than the apertures 8 in the inlet pipe 6.

Figure 6:
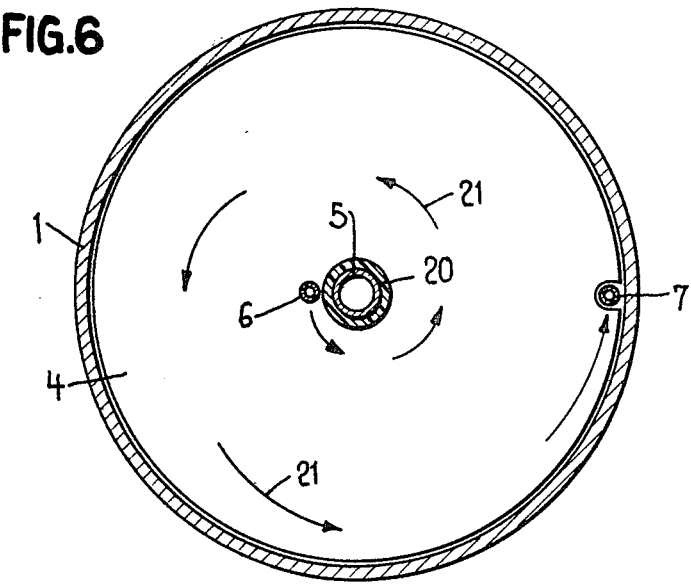
FIG. 6 is a schematic plan view of the apparatus of FIG. 1 showing the flow path of the filtering liquid.
Figure 3:
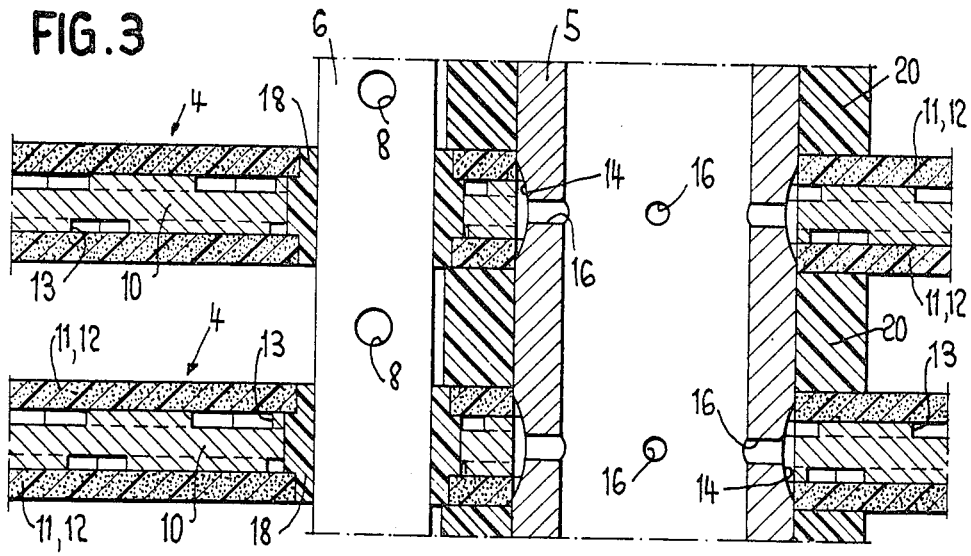
FIG. 3 is an enlarged fragmentary section of a portion of the apparatus of FIGS. 1 and 2.
Figure 4:
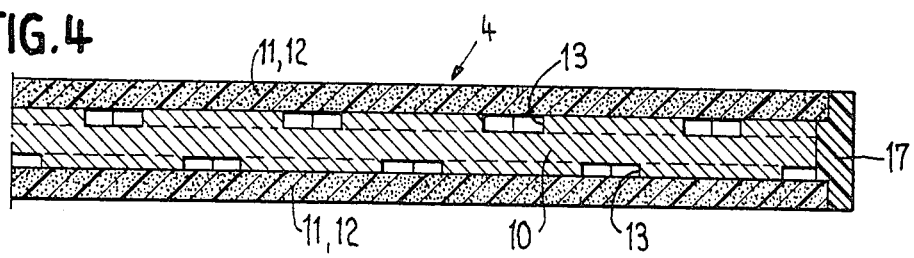
FIG. 4 is a further enlarged fragmentary section of the apparatus of FIGS. 1 and 2.
Figure 5:
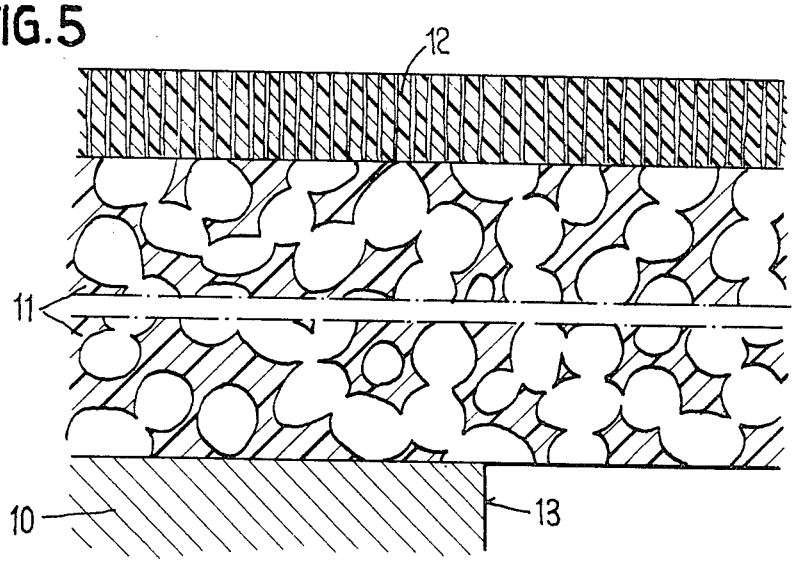
FIG. 5 is a schematic representation (not to scale) of the structure of one of the filter elements of the apparatus of FIG. 1.

As indicated in FIG. 6, the liquid to be filtered is emitted tangentially from the apertures of the inlet pipe 6, is thereby caused to rotate, and flows helically along the surface of the filter element 4 towards the aperture 9 of the outlet pipe 7. A portion of the fluid thus penetrates the filter in a direction cross-wise to the direction of flow, and the filtrate thus obtained enters the collecting pipe 5 from whence it is discharged. Due to the particularly high pressures which are used (higher than 50 bar), it is essential to construct the filter elements to be solid and pressure resistant. The disc-shaped filter element 4, as shown in detail in FIGS. 3 to 5, is essentially comprised of three layers, namely a central portion 10 made of plastic material or metal and of about 2 mm thickness in the present example, a layer 11 applied to both sides and of about 1 mm thickness of plastic material such as, for example, polyethylene, having a pore width of approximately 40 μm, and a microporous membrane 12 each applied to plastic material layer 11 and having a pore width of, for example, 1–100 nm. The manufacture of such membranes with very small pore widths is described in the applicant's copending U.S. patent application Ser. No. 918,584.

Figure 2:
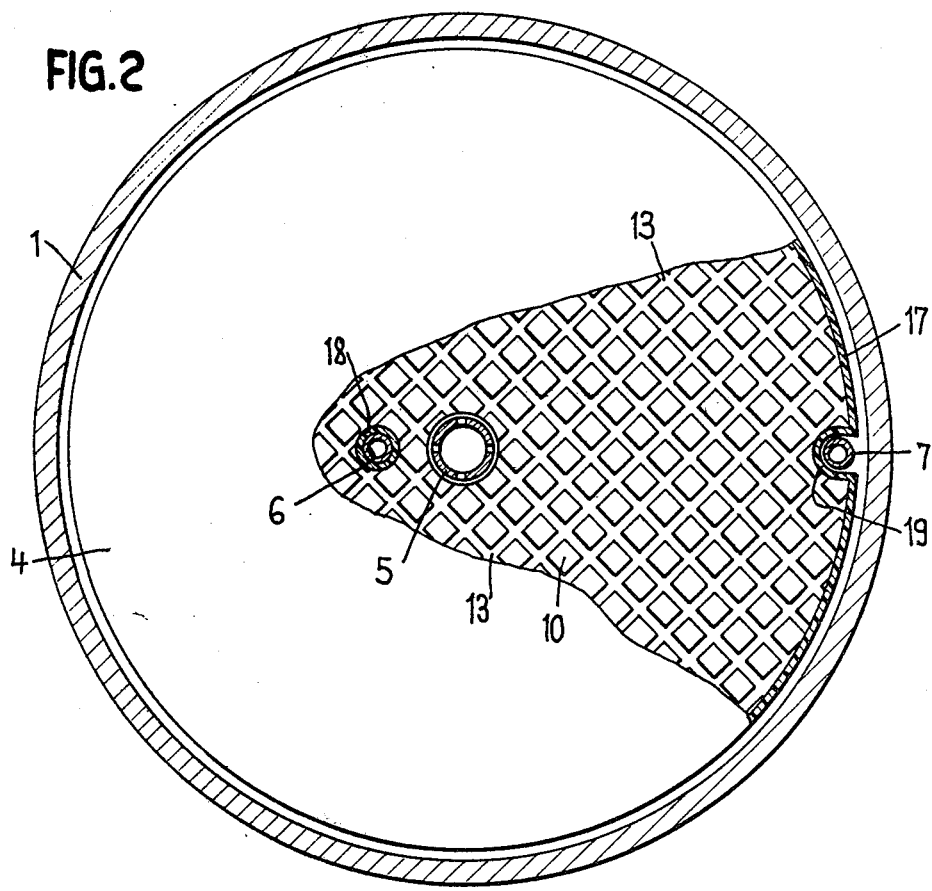
FIG. 2 is a plan view of the apparatus of FIG. 1 with a portion cut away.

Passages 13 are formed in the central portion 10 to collect the filtrate and to conduit it to the central collecting pipe 5. Passages 13 may, as indicated in FIG. 2, have a rectangular cross-section and may be constructed to form a pattern of squares similar to that of a chessboard. The passages 13 may be located on both major surfaces of the central portion 10. The filtrate is fed from the passages 13 into a circular collecting channel 14 (FIG. 3) and from there passes through apertures 16 into the filtrate pipe 5. The outer edge of each filter element and the apertures for the inlet pipe 6 and outlet pipe 7 are sealed respectively by an outer sealing ring 17 and two inside sealing rings 18 and 19, these rings being welded or otherwise connected by means of a suitable plastic material adhesive to the filter element. Spacers 20 are provided between the filter elements and are sealingly connected to the filter elements.

In the present example, the liquid is pressurised by means of a plant (not shown) to, for example 50 bar and fed tangentially through the apertures 8 of feed pipe 6, as indicated by the arrows 21 in FIG. 6. This apparatus hence operates in accordance with the so called cyclone principle. This cyclone principle, however, also operates in reverse, i.e. it is just as easy to use the peripheral pipe 7 as the inlet pipe and to use the centrally located pipe 6 as the outlet pipe. In such case, pipe 7 would have the smaller apertures and pipe 6 would have correspondingly larger apertures. If the liquid to be filtered is supplied tangentially by the peripheral pipe, an identical helical course is assumed by the fluid as in the first example. Further depending upon the kind of liquid to be filtered, it may be favorable to provide several inlet and outlet pipes, respectively. The passages 13 formed on both sides of the central section 10 of each filter element may be formed V-shaped or otherwise and need not necessarily have a square of chessboard-like pattern.

Depending upon the liquid to be filtered or whether the filtrate or the residue (filtrant) is the required end product, the liquid will be allowed to circulate in a circle in the apparatus until the required quantity of filtrate or residue is obtained. Also, a number of such apparatuses may be connected in series, if so desired, such series connection being made possible in this apparatus due to the relatively low pressure drop thereacross. This reduced pressure drop enables a substantial saving in the energy required for the filtration to be accomplished so that such apparatus may be especially used for seawater desalination.

The tubular or cylindrical jacket 1 is conveniently made of steel in order to withstand the high pressure prevailing in the apparatus, and it is advantageous to line this jacket at least internally, with a plastic material layer.

The apparatus described above is suitable not only for the filtration of liquids, but may also be applied for the treatment of gaseous materials, such as the enrichment of low viscous gases.

I claim:

1. Apparatus for cross-flow filtration of a fluid, comprising:

a tubular housing;

a filtrate collecting pipe centrally disposed within said housing;

a plurality of disc-shaped filter elements stacked one upon the other within said housing so as to provide spaces between adjacent pairs of filter elements, said elements being spaced from said housing and supported by said filtrate collecting pipe for supplying the filtrate of said elements therethrough; and at least one inlet pipe and at least one outlet pipe extending generally parallel to said filtrate collecting pipe within said housing, one of said inlet and outlet pipes being disposed adjacent said filtrate collecting pipe and extending through said filter elements, and the other of said inlet and outlet pipes being disposed adjacent the periphery of said filter elements, each of said inlet and outlet pipes defining a plurality of axially spaced aperture means, one located in the space between each adjacent pair of filter elements for parallel feed of fluid across said filter elements;

said aperture means of said inlet pipe being oriented with respect to said filter elements for feeding fluid tangentially onto said filter elements to establish a helical fluid flow simultaneously across the surface of each of said filter elements.

2. The apparatus according to claim 1, wherein each of said filter elements has a central portion with fluid flow passages defined in opposite, generally flat surfaces thereof, a porous material layer on each of said flat surfaces, and a microporous membrane on each porous material layer.

3. The apparatus according to claim 2, wherein said fluid flow passages are trough-shaped and form a pattern of squares in each flat surface of said central portion of said filter elements.

4. The apparatus according to claim 2, wherein said fluid flow passages are V-shaped in section.

5. The apparatus according to claim 2, wherein said porous layer is made of polymeric material having a pore width of about 40 $\mu$m.

6. The apparatus according to claim 1 wherein said aperture means formed in said outlet pipe are larger than said aperture means formed in said inlet pipe.

7. The apparatus according to claim 1, wherein each of said filter elements communicates with the interior of said filtrate collecting pipe through a collecting channel encircling said collecting pipe and feeding at least one aperture in said pipe.

8. The apparatus of claim 7, wherein each of said filter elements has a central portion with fluid flow passages defined in opposite, generally flat surfaces thereof, a porous material layer on each of said flat surfaces, and a microporous membrane on each porous material layer; and wherein said filter elements are axially aligned on said collecting pipe with the fluid flow passages of each filter element disposed over and in communication with a respective one of said collecting channels.

* * * * *